United States Patent [19]

Vinciguerra et al.

[11] Patent Number: 4,929,119

[45] Date of Patent: May 29, 1990

[54] SYSTEM FOR DISENGAGEABLY COUPLING A ROTOR BODY TO THE SHAFT OF ROTARY MACHINES, IN PARTICULAR GAS TURBINES AND ROTARY DOBBIES

[75] Inventors: Constantino Vinciguerra; Massimo Coppini, both of Florence, Italy

[73] Assignee: Nuovopignone-Industrie Meccaniche e Fonderia, S.p.A., Italy

[21] Appl. No.: 375,462

[22] Filed: Jul. 5, 1989

[30] Foreign Application Priority Data

Jul. 15, 1988 [IT] Italy ................. 21381 A/88

[51] Int. Cl.$^5$ ................................. B25G 3/28
[52] U.S. Cl. .................... 403/359; 403/298; 403/277
[58] Field of Search .............. 403/359, 277, 298

[56] References Cited

U.S. PATENT DOCUMENTS 3,776,651 12/1973 Peter et al. ............... 403/277 X
3,836,272 9/1974 Duer ........................ 403/359
4,619,548 10/1986 Kazaoka et al. ........... 403/359 X

FOREIGN PATENT DOCUMENTS 965381 2/1950 France ....................... 403/359

Primary Examiner—Andrew V. Kundrat
Attorney, Agent, or Firm—Morgan & Finnegan

[57] ABSTRACT

A system for disengageably coupling a rotor body to the shaft of rotary machines, in particular gas turbines and rotary dobbies, in which the coupling surface of said shaft is a cylindrical surface provided all the way round with longitudinal sharp-edged grooves of very small depth, they being uniformly distributed equidistantly to form a grooved cylindrical stub the interior of which comprises a frusto-conical bore cooperating with corresponding frusto-conical plug rigid with one end of a pull rod to lock the cylindrical coupling surface of the shaft against the cylindrical coupling surface of said rotor body by radial interference.

6 Claims, 4 Drawing Sheets

SYSTEM FOR DISENGAGEABLY COUPLING A ROTOR BODY TO THE SHAFT OF ROTARY MACHINES, IN PARTICULAR GAS TURBINES AND ROTARY DOBBIES

This invention relates to a system for coupling a rotor body to a rotary shaft which is economical, functional and simple to properly construct and check, and which enables high torques to be transmitted with considerable reliability, does not require any relative axial displacement between the two bodies to be coupled, enables exact and optimum centering to be obtained and maintained between the two coupled bodies so that it is no longer necessary to carry out final balancing of the two combined bodies, thus resulting in simple interchangeability of separately balanced rotatable bodies, and enables the coupling system to be easily and rapidly engaged and disengaged an unlimited number of times operating from an easily accessible zone, and is therefore particularly suitable for application in the rotary machine field, especially gas turbines, and in the rotary dobby field.

In the current state of the art, when a body to be rotated, such as a joint, an impeller or in particular the disc rotor of a gas turbine, is to be fitted onto a rotary shaft such that the coupling can be easily disengaged by acting from a predetermined easily accessible zone, is perfectly concentric in order not to generate unbalance, and is able to transmit high torques, the only possible method, if for obvious reasons the known coupling systems using keys or grooved plug-in systems which weaken the shaft and introduce unbalance are to be excluded, is to use a forced frusto-conical coupling system such as that described in the previous U.S. Pat. No. 4,516,906 filed by the same applicant on Apr. 8, 1982 issued on May 14, 1985.

In this known system the torque is transmitted from the rotary shaft to the rotor body by radial interference between two frusto-conical surfaces of the two bodies to be coupled, this being obtained by axially moving the two said frusto-conical surfaces relative to each other. More specifically, a frusto-conical end of the rotary shaft is inserted into a corresponding frusto-conical axial cavity in the rotor body, to which it is locked by a pull rod provided in the hollow shaft to pull together the two bodies to be coupled so that the two frusto-conical surfaces mate and copenetrate until sufficient radial interference is created between them to transmit the required torque by friction.

Such a coupling system has however a series of serious drawbacks which often create problems to the extent of prejudicing its application.

The main drawback is without doubt the fact that the frusto-conical cavity of the rotor body and the frusto-conical end of the shaft, this generally being the fixed element comprising support bearings and thrust bearings, have always to be subjected to an axial relative movement towards or away from each other. This movement, which when large dimensions are involved in the coupling system, such as in power transmission between the shaft and rotor in land-based gas turbines, can be as much as a few millimeters, gives rise to serious problems because of the danger that delicate parts of the rotor such as the blades, which operate with their outer extremity just skimming a conical surface, can undergo damage by rubbing, or can break the seals. Indeed, these dangers in some cases make it inadvisable to use a forced frusto-conical coupling system in gas turbines, in spite of its undeniable advantage of making the maintenance of such turbines extremely simple as it allows dismantling from the outside of the machine. A further drawback of said known coupling system arises from the actual frusto-conical shape of the surfaces to be coupled, which being difficult to form and to check do not allow optimum centering between the rotor body and rotary shaft. In known manner, this gives rise to considerable unbalance in the assembly to the extent of making the use of a forced frusto-conical coupling system unacceptable without subsequently balancing the combined shaft and rotor body, thus making it impossible to quickly interchange rotors which have been balanced separately from the shaft.

A further drawback is the not very high torque which can be transmitted by such a coupling system.

The object of the present invention is to obviate said drawbacks by providing a system which allows effective and simple disengageable coupling of a rotor body to a hollow rotary shaft without the need for any relative axial movement between said bodies to be coupled, is of considerable reliability and is therefore able to transmit large torques, and finally which allows optimum centering between the shaft and rotor body such that this latter can be easily interchanged with another rotor body without the coupled assembly having to be newly balanced.

This is substantially attained by using for the coupling system not frusto-conical surfaces but instead cylindrical surfaces which as is well known are considerably more simple to construct and to check. In this respect, as said cylindrical coupling surfaces can be perfectly constructed and checked, it is now possible to always maintain the concentricity or centering between the rotary shaft and rotor body at an optimum level, with minimum unbalance of negligible effect, a condition which by allowing simple, rapid and economical replacement of the rotor body with another rotor body which has been independently balanced separately from the shaft, without the need for final balancing, solves an extremely important problem in series production and opens a new horizon for rotary machines, in particular gas turbines.

The high-reliability disengageable coupling system without the need for axial displacement of said cylindrical surfaces has been made possible according to the invention in that on the shaft cylindrical coupling surface, having a diameter and axial length of the same order as those of the cylindrical surface of the cavity in the rotor body to be coupled, but with sufficient tolerance to allow free mounting, there are provided longitudinal grooves of very small depth, of the order of a few tenths of a millimeter, their purpose being to act as lightening or pressure relieving slots as explained hereinafter. Said shallow grooves extend along the entire axial length of the cylindrical surface to be coupled, have sharp edges substantially deriving from the mechanical machining by which they are constructed, and are uniformly distributed equidistantly about the circumference of said cylindrical surface to form substantially a grooved cylindrical stub in which the grooves have a length approximately equal to the solid portions by which they are separated. It has been found experimentally that the optimum result is obtained by providing 8÷12 longitudinal grooves equidistantly spaced about the circumference, as a larger number of consequently narrower grooves would not allow effective coupling to be obtained, whereas a smaller number of consequently wider grooves would create tensions which would abnormally and too highly stress the rotor body to be coupled.

As said grooves have purely a lightening function the purpose of which is to prevent contact a consequent pressure transmission, they do not have to be formed to close tolerances or have special surfaces, with the result that they are simple and inexpensive to form, while their very shallow depth ensures no reduction in the mechanical strength of the rotary shaft.

Within said grooved cylindrical stub of the rotary shaft there is provided a frusto-conical bore with a length equal to the length of said stub and with its major diameter at the free end of the stub, said bore cooperating with a corresponding frusto-conical plug extending in the form of a pull rod which passes through the entire hollow rotary shaft and can be pulled tight under a predetermined load from the opposite end of the shaft, in an easily accessible zone, by a suitable cylinder-piston unit and then locked in position by a locking nut while said cylinder-piston unit keeps the pull rod tensioned under the required load. In this manner, by the effect of the applied load, a relative axial movement is created between the frusto-conical surfaces of said plug and said bore, which by mutual interference within said grooved cylindrical stub of the rotary shaft cause said stub to undergo radial expansion which thus radially compresses the surface of the cylindrical cavity in the rotor body to be coupled, without requiring any relative axial movement between the shaft and rotor body, as desired.

However, this elastic radial compression action occurs, under the effect of the longitudinal lightening grooves provided in the cylindrical connection surface of the rotary shaft, only in the non-lightened zones. A state is therefore created in which a layer of radial compression comprises equidistant uncompressed zones, to generate a state of tension such that the consequent elastic deformation creates, in correspondence with the relieving zones, swollen or expanded portions of the cylindrical cavity of the rotor body which penetrate into said longitudinal grooves of the shaft. During torque transmission these swollen portions behave as a series of microkeys which experimental tests have shown able to allow transmission of torques two to three times greater than those transmittable with a normal forced frusto-conical coupling system of equal length and average diameter.

This enables the field of application of this system to be also extended to those causes in which the forced frusto-conical coupling system cannot be used because it provides insufficient torsional reliability for the rotary shaft.

Again, because said swollen portions of the rotor body and said radial expansion of the grooved shaft stub are generated by elastic deformation, it is clear that when the load applied to the frusto-conical plug by the pull rod is removed for demounting purposes, said elastic deformation is nullified and the rotor body can be easily demounted without any trace of sticking, so making the system disengageable a practically unlimited number of times. The invention is described in detail hereinafter with reference to the accompanying drawings which illustrate preferred embodiments thereof given by way of non-limiting example only as technical or constructional modifications can be made thereto but without leaving the scope of the present invention.

Figure 1:
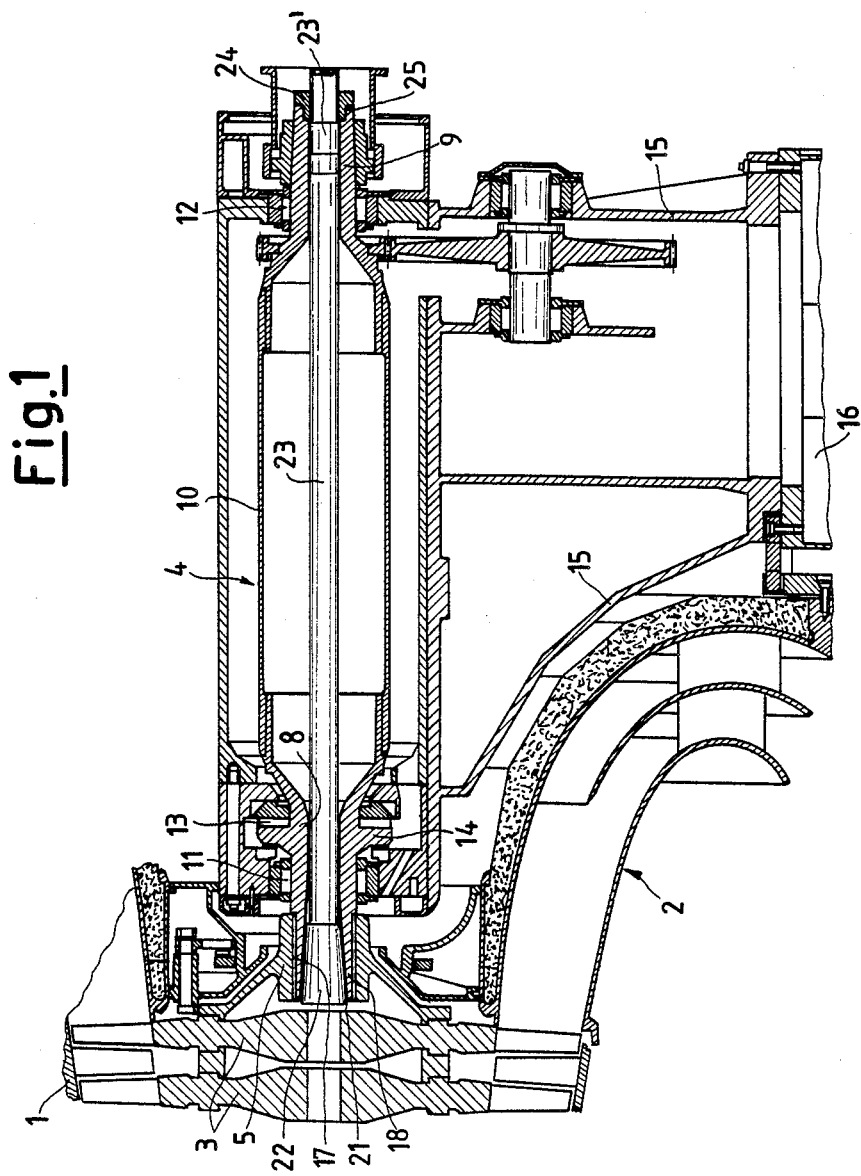
FIG. 1 is a partial longitudinal section through that part of a gas turbine in which the disengageable coupling system according to the invention is applied.
Figure 2:
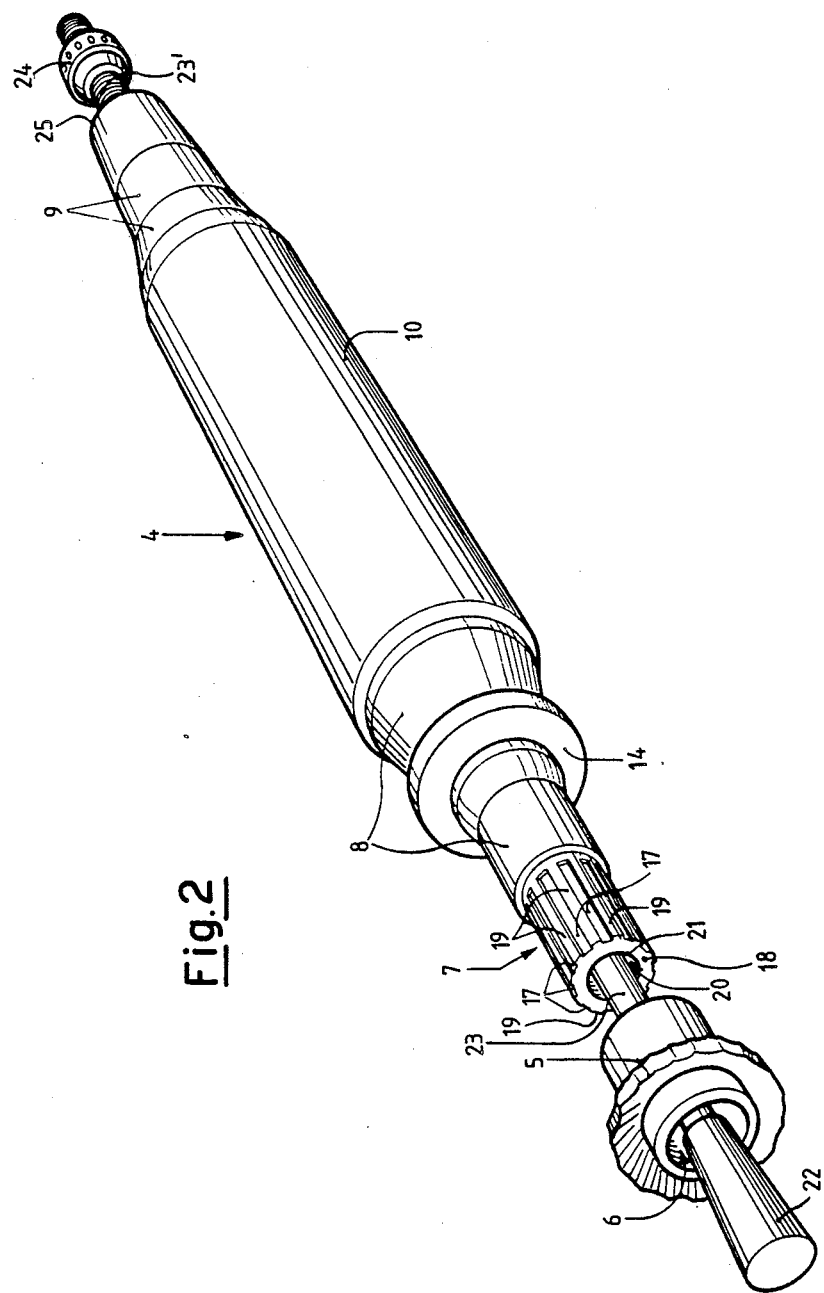
FIG. 2 is an exploded perspective view to an enlarged scale of the disengageable coupling system used in FIG. 1.
Figure 3:
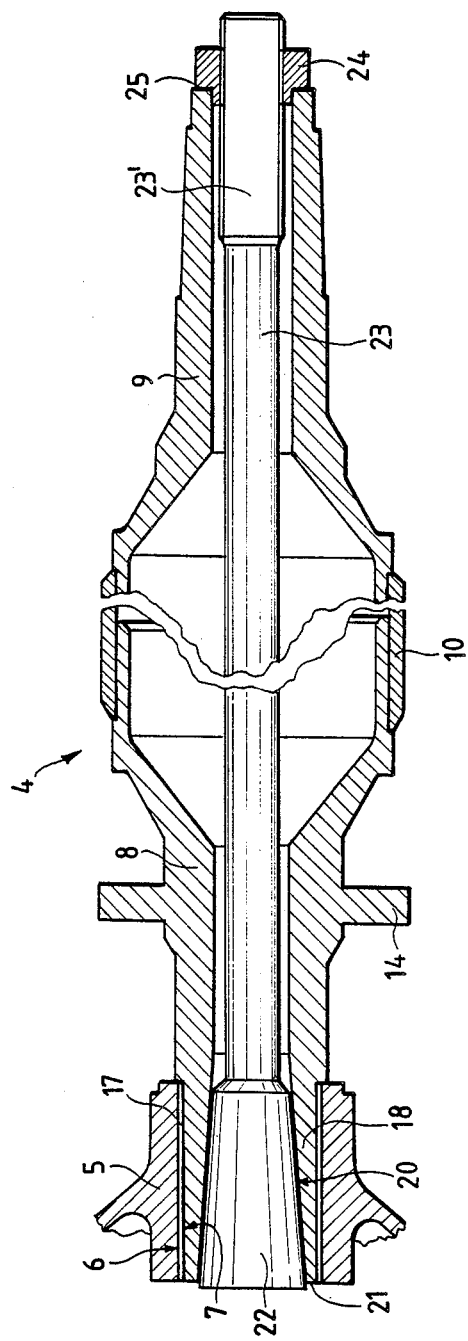
FIG. 3 is a longitudinal section through the disengageable coupling system of FIG. 2 in the mounted state.

With reference to the figures, 1 indicates the stator casing of the power stage 2 of a gas turbine, the rotor 3 of which, consisting in the figure of two blade-carrying discs, is projectingly supported on the power shaft 4 by the hub 5 of said rotor, which has a cylindrical axial cavity 6 (see specifically FIG. 2) forming the inner coupling surface of said rotor, into which the corresponding cylindrical coupling surface 7 of the power shaft 4 is inserted. Said shaft 4 is hollow and has two endpieces, 8 and 9 respectively, of which the endpiece 8 also comprises said cylindrical coupling surface 7, and which are joined together by a central tube 10 mounted thereon with an interference fit, the shaft being rotatably supported by two support bearings 11 and 12 (see FIG. 1) and by the thrust bearing 13 cooperating with the thrust ring 14 of the endpiece 8 of the shaft 4, said bearings being supported by the structure 15 of the gas turbine housing 16.

The two said cylindrical coupling surfaces 6 and 7 have the same axial length and approximately equal diameters to enable the surface 6 to be mounted over the surface 7 in a simple and free manner. This latter coupling surface is provided with sharp-edged longitudinal grooves 17 of very small depth extending along the entire axial depth of said surface 7. The grooves 17 are uniformly distributed equidistantly about the circumference of the cylindrical coupling surface 7 to form substantially a grooved cylindrical stub 18 and have a width preferably equal to that of the solid portions 19 which separate them (see specifically FIG. 2).

Figure 4:
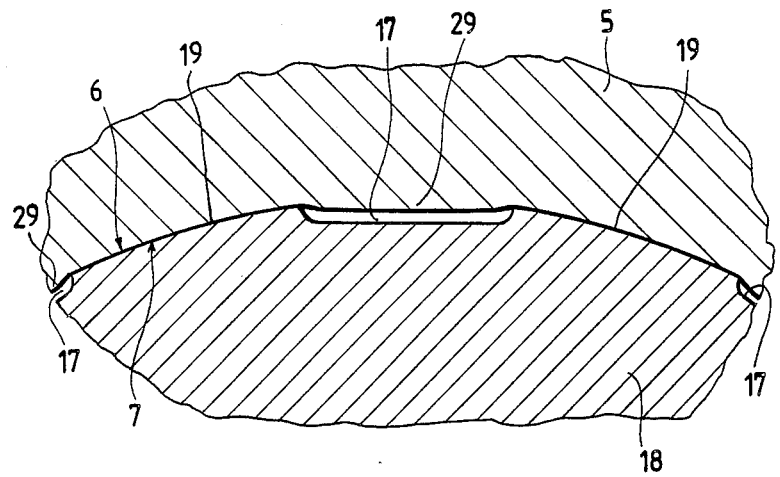
FIG. 4 shows a highly enlarged detail of the disengageable coupling system according to the invention, showing the effect of the elastic radial expansion of the system.
Figure 5:
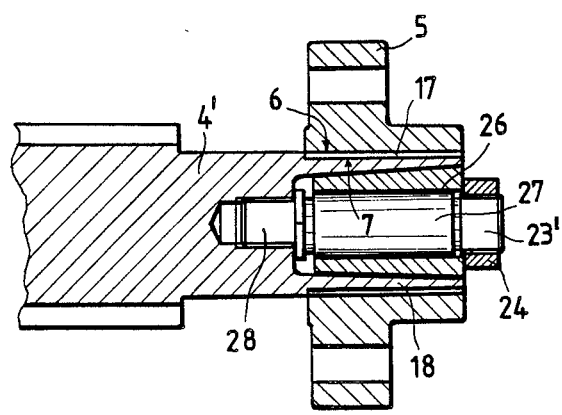
FIG. 5 is a partial longitudinal section through a modified embodiment according to the invention showing a disengageable coupling system for application to a rotary dobby.

According to a preferred embodiment the groove dimensions are chosen such as to provide between 8 and 12 grooves about the stub 18. The axial bore 20 through said grooved cylindrical stub 18 is of frusto-conical shape with the major diameter at the free end 21 of the stub, and cooperates with a corresponding frusto-conical plug 22 rigid with one end of a pull rod 23 which passes through the interior of the hollow shaft 4 to lock said cylindrical coupling surfaces 6 and 7 together by radial interference under a predetermined load obtained hydraulically by a cylinder-piston unit and then maintained by a locking nut 24 acting on the other threaded end 23' of the pull rod 23 and cooperating with the front edge 25 of the end 9 of the hollow power shaft 4. In this respect, the axial movement of the plug 22 caused by the tensioning of the pull rod 23 causes the stub 18 to undergo elastic radial expansion with the result that the solid portions 19 of its coupling surface 7 compress the inner surface of the cylindrical cavity 6 of the hub 5 of the rotor body. Said intermittent elastic compression causes said inner surface of the cavity 6 to expand into the grooves of the stub 18 by means of swellings 29 which behave as microkeys during torque transmission (see specifically FIG. 4). In the modified embodiment shown in FIG. 5, which is particularly applicable to the field of rotary dobbies in which the torques to be transmitted are much smaller, a hollow frusto-conical plug 26 is used which enables the pull rod 27 passing through said hollow plug 26 to be tensioned by means of a locking nut 24 operating from the same end as the plug. For this purpose the pull rod 27 has one end 23' threaded for said nut 24 and its other end 28 also threaded so that it can be screwed into the rotary shaft 4', which no longer needs to be hollow.

We claim:

1. An improved system for disengageably coupling two members, comprising:

a shaft having an end portion, at least said end portion of said shaft being hollow so as to form a cavity, said end portion having a cylindrical outer coupling surface of a certain length, said cavity being frustro-conical in shape with a frusto-conical cavity wall and a wider end and a narrower end, said wider end lying nearer said end of said shaft than said narrower end;

a rotor body having a relatively smooth cylindrical inner coupling surface of a length that is about the same as that of said cylindrical outer coupling surface, said inner and outer coupling surfaces being of approximately the same diameter and dimensioned so that said rotor body and said end portion of said shaft slidably engage one another, allowing said rotor body to be slid onto said end portion;

a frustro-conical plug having a wider end and a narrower end, said plug being slidably disposed within said cavity with said wider end lying nearer said end of said shaft than said narrower end, said plug having a frusto-conical outer surface matching that of said cavity wall so that when said plug is inwardly slid into said cavity said frustro-conical surface of said plug engages said frustro-conical cavity wall; and, means for controllably urging said plug inward into said cavity;

said cylindrical outer coupling surface having a plurality of sharp-edged grooves of relatively small depth extending along approximately said length of said cylindrical outer coupling surface, said grooves being distributed approximately symmetrically about said cylindrical outer coupling surface, said grooves being dimensioned so that when said means for controllably urging presses said plug into said cavity said end portion is elastically deformed so as to be displaced outward, causing said end portion to radially interfere with said rotor body, whereby said cylindrical outer coupling surface disposed between said grooves presses outward against and engages said cylindrical inner coupling surface, elastically compressing said rotor so that those portions of said cylindrical inner coupling surface disposed adjacent to said grooves extend at least partially inward into said grooves to form a plurality of projections which cooperate with said grooves to prevent relative motion between said shaft and said rotor body.

2. An improved system for disengageably coupling two members as in claim 1, wherein said grooves have a width approximately equal to that of said portions of said cylindrical outer coupling surface disposed between said grooves.

3. An improved system for disengageably coupling two members as in claims 1 or 2, wherein said plurality of grooves is between 8 and 12 in number.

4. An improved system for disengageably coupling two members as in claim 1, wherein said depth of said grooves is on the order of a tenth of a millimeter.

5. An improved system for disengageably coupling two member as in claim 6, wherein said depth of said grooves is on the order of a tenth of a millimeter.

6. An improved system for disengageably coupling two members as in claim 3, wherein said depth of said grooves is on the order of a tenth of a millimeter.

* * * * *